(12) United States Patent
Markel et al.

(10) Patent No.: US 7,213,255 B2
(45) Date of Patent: May 1, 2007

(54) SET-TOP PREVIEW PROGRAM

(75) Inventors: Steven O. Markel, Highlands Ranch, CO (US); Ian Zenoni, Highlands Ranch, CO (US)

(73) Assignee: Intellocity USA, Inc., Denver, CO (US)

(*) Notice: Subject to any disclaimer, the term of this patent is extended or adjusted under 35 U.S.C. 154(b) by 1030 days.

(21) Appl. No.: 09/934,108

(22) Filed: Aug. 21, 2001

(65) Prior Publication Data
US 2002/0026637 A1   Feb. 28, 2002

Related U.S. Application Data

(60) Provisional application No. 60/228,002, filed on Aug. 25, 2000.

(51) Int. Cl.
*H04N 9/74* (2006.01)
*H04N 5/445* (2006.01)

(52) U.S. Cl. .................. 725/37; 725/112; 725/113; 348/587; 348/592

(58) Field of Classification Search ............. 348/587, 348/592; 725/37, 112, 113
See application file for complete search history.

(56) References Cited

U.S. PATENT DOCUMENTS

| 4,408,221 A | | 10/1983 | McCoy | |
|---|---|---|---|---|
| 5,196,922 A | * | 3/1993 | Yeomans | 348/578 |
| 6,023,714 A | | 2/2000 | Hill et al. | |
| 6,034,739 A | * | 3/2000 | Rohlfing et al. | 348/586 |
| 6,057,842 A | | 5/2000 | Knowlton et al. | |
| 6,222,531 B1 | * | 4/2001 | Smith | 715/803 |
| 6,239,845 B1 | * | 5/2001 | Itagaki et al. | 348/552 |
| 6,754,905 B2 | * | 6/2004 | Gordon et al. | 725/38 |
| 2002/0007493 A1 | * | 1/2002 | Butler et al. | 725/109 |
| 2003/0088878 A1 | * | 5/2003 | Rogers et al. | 725/109 |

FOREIGN PATENT DOCUMENTS

| EP | 08/37599 | 4/1998 |
|---|---|---|
| GB | 2327837 | 2/1999 |
| WO | WO99/35832 | 7/1999 |

OTHER PUBLICATIONS

International Search Report, Ladas & Parry, Mar. 6, 2002.
U.S. Appl. No. 09/933,927, filed Aug. 21, 2001, System and Method for Distribution of Interactive Content to Multiple Targeted Presentation Platforms—by Steven O. Markel.
U.S. Appl. No. 09/935,492, filed Aug. 23, 2001, System and Method for Web Based Enhanced Interactive Television Content Page Layout—by Steven O. Markel.

* cited by examiner

*Primary Examiner*—Chris Kelley
*Assistant Examiner*—Reuben M. Brown
(74) *Attorney, Agent, or Firm*—Marc S. Kaufman; Nixon Peabody, LLP

(57) ABSTRACT

Disclosed is a system for generating a graphics window that is capable of emulating enhanced video from a combined video and interactive content stream. The set-top emulator can randomly access the combined video and interactive content stream to provide an easy manner of randomly accessing portions of the combined video and interactive stream for quality control purposes. Random access allows selective viewing of the enhanced video which saves time. Additionally, the combined video and interactive content stream can be simultaneously viewed as it is being produced to allow immediate feedback to an interactive television producer.

5 Claims, 8 Drawing Sheets

| REFERENCE | XML SCRIPT | COMMENT |
|---|---|---|
| 702 |  | Start of page |
| 704 | <element> | An element within the page |
| 706 | <type>graphic</type> | Type of element |
| 708 | <name>ad</name> | Name of graphic |
| 710 | <src>tahoe.jpg</src> | Source of the graphic |
| 712 | <top>15</top> | Top position of graphic |
| 714 | <left>320</left> | left position of graphic |
| 716 | <url>localChevyDealer.htm</url> | url 'behind' the graphic |
| 718 | <trigger> | A trigger for this page |
| 720 | <time>00:01:17</time> | Time for the the trigger (1 minute, 17 seconds) |
| 722 | <trProp>src</trProp> | What property to change |
| 724 | <trElement>ad<//> | What element to change |
| 726 | <trNew>suburban.jpg<//> | The new property value for the element |
| 728 | </trigger> | End of trigger |
| 730 | </element> | End of element |
| 732 |  | End of page |

FIGURE 7

SET-TOP PREVIEW PROGRAM

CROSS-REFERENCE TO RELATED APPLICATIONS

The present invention is based upon and claims priority from U.S. provisional application Ser. No. 60/228,002 filed Aug. 25, 2000 entitled "A Data Driven System and Method for Distribution of Interactive Content to Multiple Targeted Presentation Platforms" by Steven O. Markel.

BACKGROUND OF THE INVENTION a. Field of the Invention

The present invention generally pertains to interactive television and more particularly to software programs for previewing combined video and interactive content.

b. Description of the Background

Interactive TV is based upon the concept of simultaneously displaying media objects such as audio/video content with interactive TV content objects such as HTML web pages that allows a viewer to access Internet web pages. The combined video/audio and interactive content data may be generated by iTV producers, content providers or others. The combined content is transmitted to viewers who can view and utilize the combined content materials.

In a process of generating the combined content, it is necessary to lay out the structure of the display. For example, the media object may appear as a background display with the interactive TV content object as a foreground display that only covers a smaller portion of the screen. Alternatively, the media object may appear as a transparent portion of the interactive TV content that covers the remaining portion of the screen. In any event, the interactive screen display must be laid out in some fashion that allows viewing of both the interactive TV content object and the media object. Usually, layout schemes exist that provide for optimal viewing of both the interactive TV content object and the media object on the single display. In other words, interactive TV content display portions and the video display portions do not interfere with one another and are displayed in an optimal fashion for viewing. Other portions should also be verified beyond the interactive TV content display portions and the video display portions. For example, the navigation link, event triggering and overall functionality built into the enhanced content should also be verified.

iTV producers and others who generate the combined video and interactive content information use software programs such as iTV Producer and iTV Author, which are both available from Intellocity Inc., 1400 Market Street, Denver, Colo. 80202. After the combined video and interactive content is generated using a program such as this by interactive television producers, the combined content must be checked to make sure that the display is properly generated. Currently, the combined content must be applied to several set-top boxes and the content viewed in its entirety with modifications being made after the viewing process has been completed. This is a time consuming and error prone process performed by highly paid software engineers who are capable of operating the interactive television production software, and involves expensive equipment.

It would therefore be advantageous to provide a software program that can simulate the functions of various set-top box platforms to allow random access to certain portions of the combined content stream to ensure that the combined content stream provides the desired display of information, while simultaneously allowing the editing of the combined content stream.

SUMMARY OF THE INVENTION

The present invention overcomes the disadvantages and limitations of the prior art by providing a software emulation program that allows a personal computer to emulate the functions of various set-top boxes so that a combined video and an enhanced content stream can be displayed and randomly accessed to ensure that a desired layout is achieved for the displayed information. By allowing random access to various portions of the combined content stream, only critical portions of the combined content stream need to be checked which greatly reduces the review period. For example, it may only be necessary to check the combined display when there is a change in the interactive TV content that is being displayed or a change of scene in the video stream. Hence, only those portions where the interactive TV content has changed may require checking to ensure that the combined content is properly displayed. For example, it may be valuable to check to make sure that each new section of interactive TV content does not obscure some important portion of the media object.

Further, since a computer is being used to view the combined content stream, the combined content stream can be accessed and modified in a very quick fashion while it is being checked. This process additionally reduces the time in checking and modifying the combined content stream.

The validation process may also involve verifying that the navigation links are operational, and that any other functionality created as part of the enhancement works as intended.

The present invention may therefore comprise a method of emulating the functions performed by a set-top box to display an enhanced video stream on a computer that includes a combination of video content and interactive content comprising: generating a layout file that provides time based actions that are applied to the video content and the interactive content; applying a set of rules to the layout file that produce instructions that emulate the functionality of a set-top box when applied to a browser; examining the interactive content to select a color that is not being used by the interactive content; assigning the color as a transparent color; locating the video content in the enhanced video stream to generate video content location data; setting portions of the enhanced video stream corresponding to the video content location data as the transparent color.

The advantages of the present invention are that combined video and interactive content streams can be checked for quality assurance in a very quick and easy fashion. The combined content stream can also be modified during the quality assurance checking process in an expeditious manner. Further, the present invention may be used in combination with authoring programs such as iTV Producer, available from Intellocity, that allow interactive TV producers to check the combined video and interactive content stream as it is produced which reduces time of production and provides optimal desired results.

BRIEF DESCRIPTION OF THE DRAWINGS

In the drawings,

FIG. 7 is a program listing of an XML script that specifies the assets (e.g., graphics and text) of a page, the layout information of the page assets (e.g., position of the graphics), the properties of the assets (e.g., the font, font size and color), and the triggers required to provide the desired enhanced content.

DETAILED DESCRIPTION OF THE PREFERRED EMBODIMENT OF THE INVENTION

Figure 1:
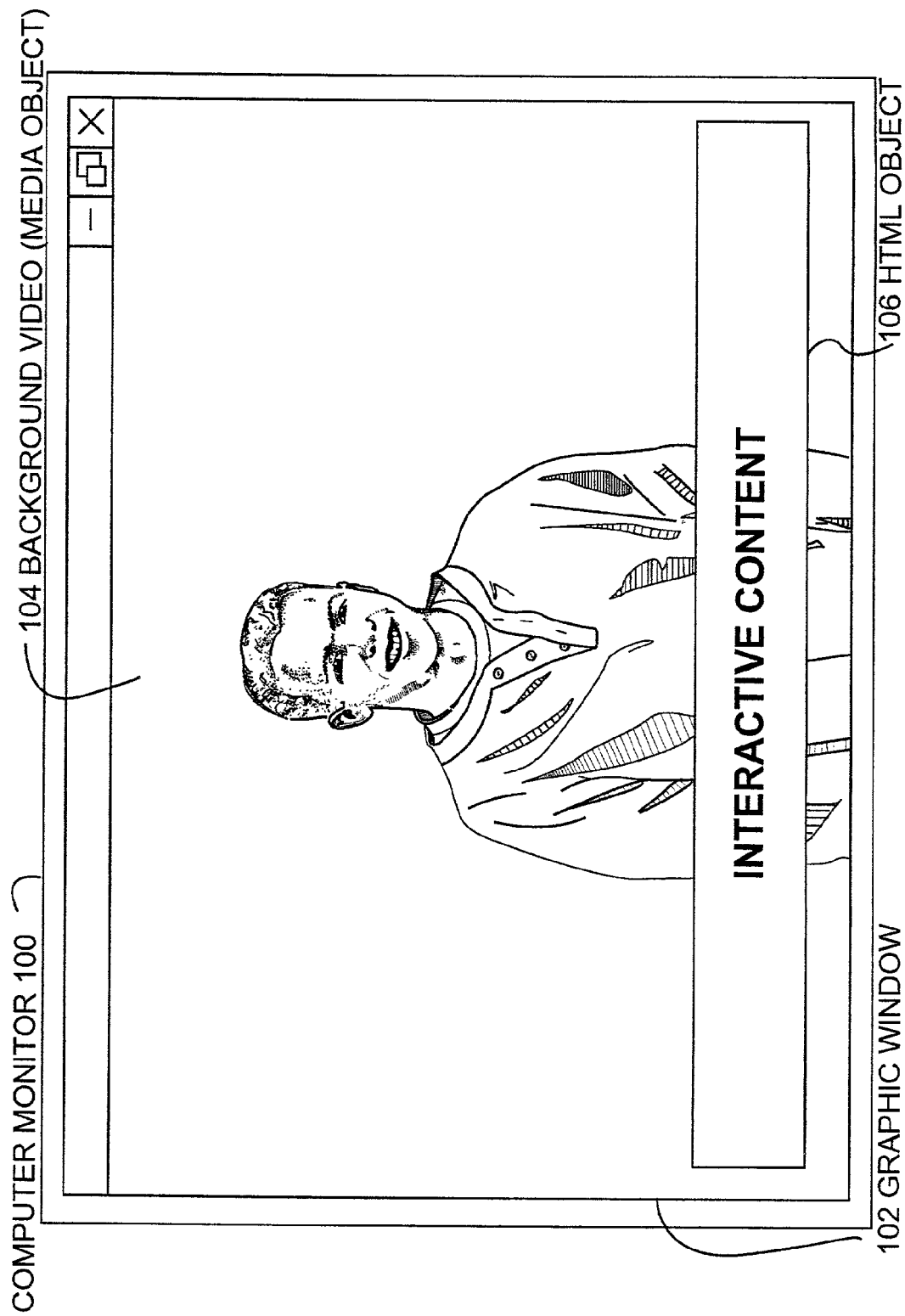
FIG. 1 is a schematic illustration of a computer monitor screen that is displaying a combined video and interactive content stream utilizing the present invention.

FIG. 1 is schematic illustration of a computer monitor 100 that displaying a graphic window 102 that is generated in accordance with the present invention. The graphic window 102 may be a window generated under, and compatible with, a Microsoft operating system, or other operating systems. The graphic window 102 emulates the display that would otherwise be created on a TV set when a combined video and interactive content stream is applied to a set-top box that is connected to the TV. As shown in FIG. 1, the graphic window displays a media object 104 which is background video as illustrated in FIG. 1. The graphic window 102 also displays an HTML object 106 that appears as interactive content in the foreground of the graphic window 102. In other words, the HTML object 106 obscures and covers the background video 104. Hence, to obtain an optimal display, the interactive content 106 must be placed in a position that does not obscure important portions of the background video 104. Hence, the iTV producer that encodes the video with interactive content must carefully select the location of the interactive content 106 on the background video 104. If the interactive content 106 is not placed in the proper location on the picture, valuable content of the background video 104 may be lost.

Figure 2:
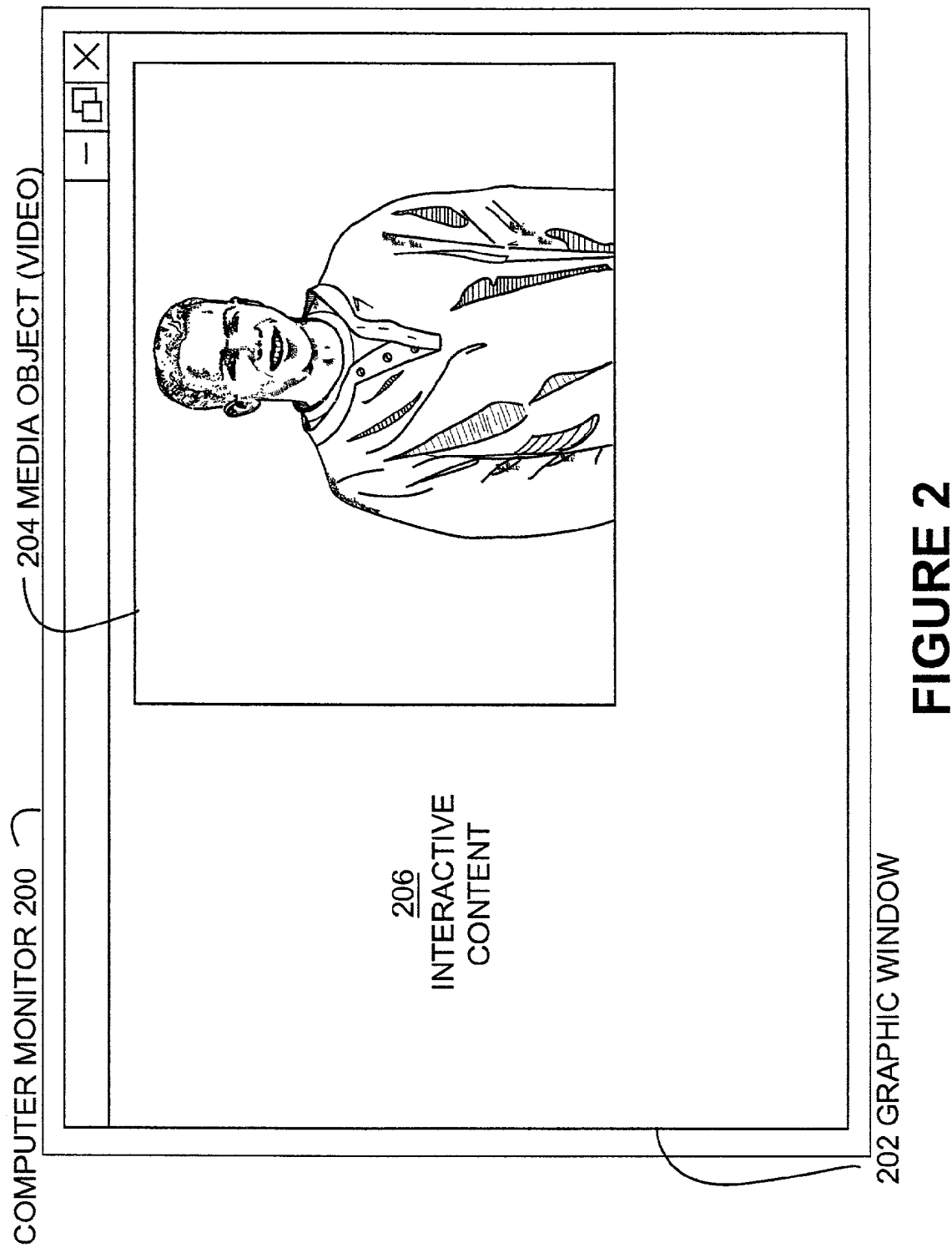
FIG. 2 is a view of a computer monitor screen that is displaying another example of a combined video and interactive content stream.

FIG. 2 illustrates a computer monitor 200 that also includes a graphic window 202 that is generated in accordance with the present invention to emulate the display of a combined video and interactive content stream as it would appear on a TV connected to a set-top box. FIG. 2 discloses another manner of displaying the combined video and interactive content stream in which the media object 204 (i.e., the video) is placed in a transparent window within the interactive content 206 and the viewable portion of the interactive content 206 is displayed on the remaining portion of the screen. The window 204, in which the media object appears, comprises a transparent portion of the interactive content 206. Hence, the interactive content 206 must be placed in portions that do not coincide with the transparent window 204 to insure that all of the information of the interactive content 206 is properly displayed. If interactive content 206 is placed on the transparent window 204, it will not appear on the display since the media object 204 appears within the transparent window.

Figure 3:
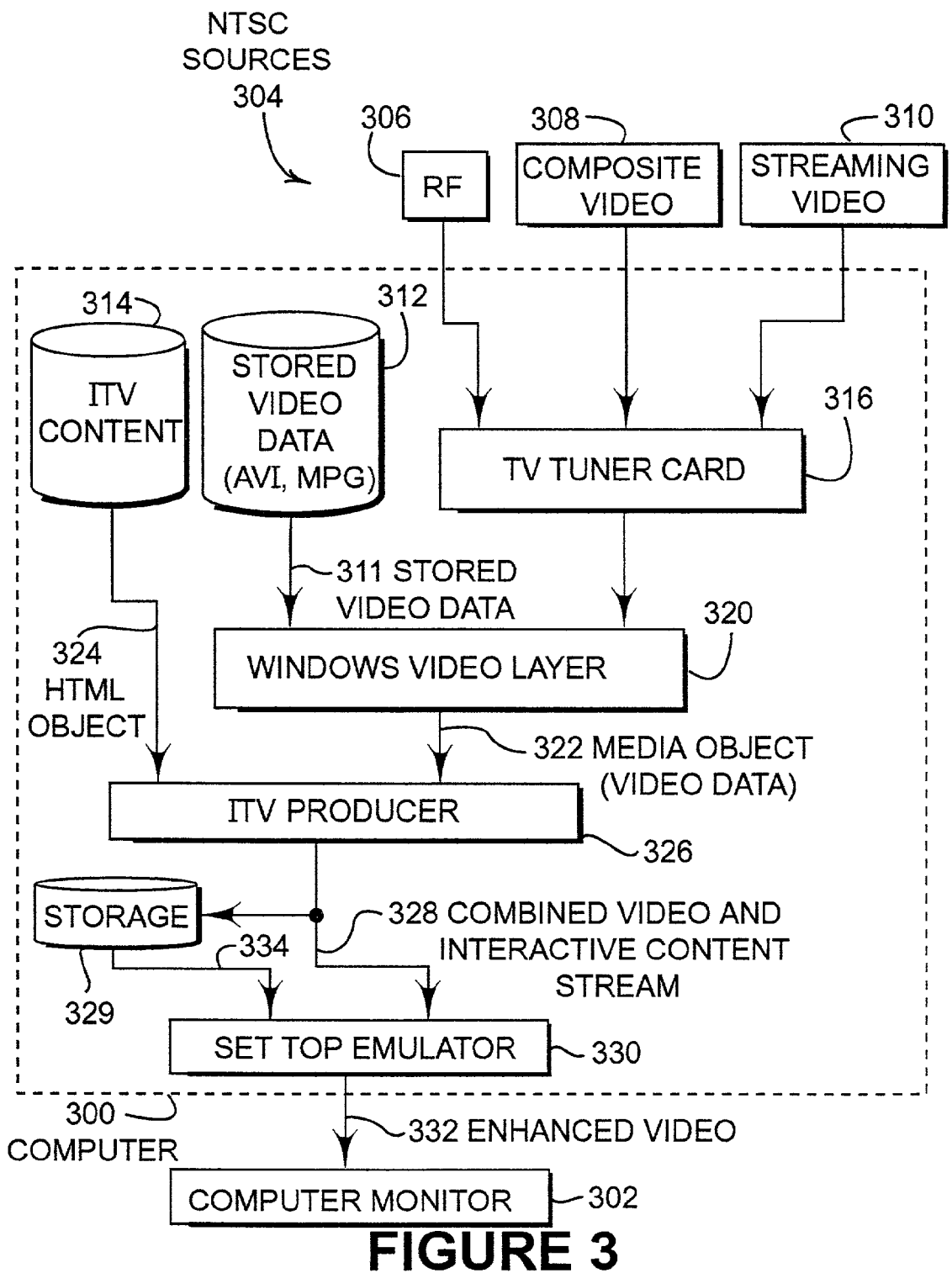
FIG. 3 is a schematic diagram of the environment in which the present invention operates.

FIG. 3 is a schematic block diagram illustrating an implementation of the present invention. As shown in FIG. 3, a computer 300 is utilized to generate and display enhanced video 332 on a computer monitor 302. Computer 300 includes an interactive TV (iTV) producer 326 that is used to generate the combined video and interactive content stream 328. The iTV producer 326 may comprise a software program loaded into the computer 300 that receives a media object 322, such as video data, as well as an HTML object 324 that comprises interactive TV content stored in a storage device 314. The iTV producer 326 combines the HTML object 324 and the media object 322 in a desired fashion such as illustrated in FIGS. 1 or 2.

A feature of the iTV producer 326 that is illustrated in FIG. 3 is that the iTV producer 326 can be used to place the background video and interactive content on the display screen so that important portions of both the HTML object 324 and the media object 322 are not obscured by one another. The iTV producer 326 includes tools for laying out the HTML object 324 and media object 322 to accomplish this task and prevent obscuration of important information. The iTV producer is disclosed more fully in U.S. patent application Ser. No. 60/228,002 filed Aug. 25, 2000 entitled "A Data Driven System and Method for Distribution of Interactive Content to Multiple Targeted Presentation Platforms" which is specifically incorporated herein by reference for all that it discloses and teaches.

Computer 300 of FIG. 3, as pointed out above, uses the iTV content that is stored in a storage device 314 as the HTML object 324 to generate the combined video and interactive content stream 328. The media object 322 is generated from video data that is produced by a Windows video layer 320. The Windows video layer is a standard program provided by Microsoft that interfaces with various sources of video data to provide the media object 322 in a common format.

The Windows video layer 320 can receive video data from various sources. For example, the Windows video layer 320 may receive stored video data 311 such as AVI or MPEG data from a storage device 312 which may reside within the computer 300. This data may have been previously stored in the computer 300. The Windows video layer 320 may also receive external video data 318 from a TV tuner card 316 which may also reside within the computer 300. The TV tuner card 316 may be coupled to various NTSC sources 304 such as an RF source 306, a composite video source 308, or a streaming video source 310. The TV tuner card can be any commonly available tuner card such as the "All in Wonder" tuner card available from ATI, Inc.

The combined video and interactive content stream 328 that is produced by the iTV producer, as shown in FIG. 3, is stored in storage device 329 for later use. The combined video and interactive content stream 328 can also be applied to the set-top emulator 330. The set-top emulator is capable of generating an enhanced video signal 332 in the same manner as a set-top box so that the enhanced video 332 can be displayed on a computer monitor 302 as illustrated in FIGS. 1 and 2. The computer emulator 330 can comprise a software program or a hardware accelerator that performs the functions of the set-top box and generates a graphic window such as graphic window 102 of FIG. 1 and 202 of FIG. 2 for display on the computer monitor 302 as indicated above.

The advantage of the system illustrated in FIG. 3 is that the iTV producer, using the computer 300, can view the enhanced video 332 as it is being generated by the iTV producer, or randomly access the combined video and interactive content stream 328 that has been stored in storage device 329 via connection 334. In other words, the computer 300 can access any portion of the stored combined video and interactive content stream to determine how portions of that content stream may appear when displayed on the computer monitor 302 as enhanced video 332. Another emulation program is disclosed in provisional patent application Ser. No. 60/228,002 filed Aug. 25, 2000, entitled "Data Driven System and Method for Distribution of Interactive Content to Multiple Target Presentation Platforms" by Steven O. Markel, which is specifically incorporated herein by reference for all it discloses and teaches.

Figure 4:
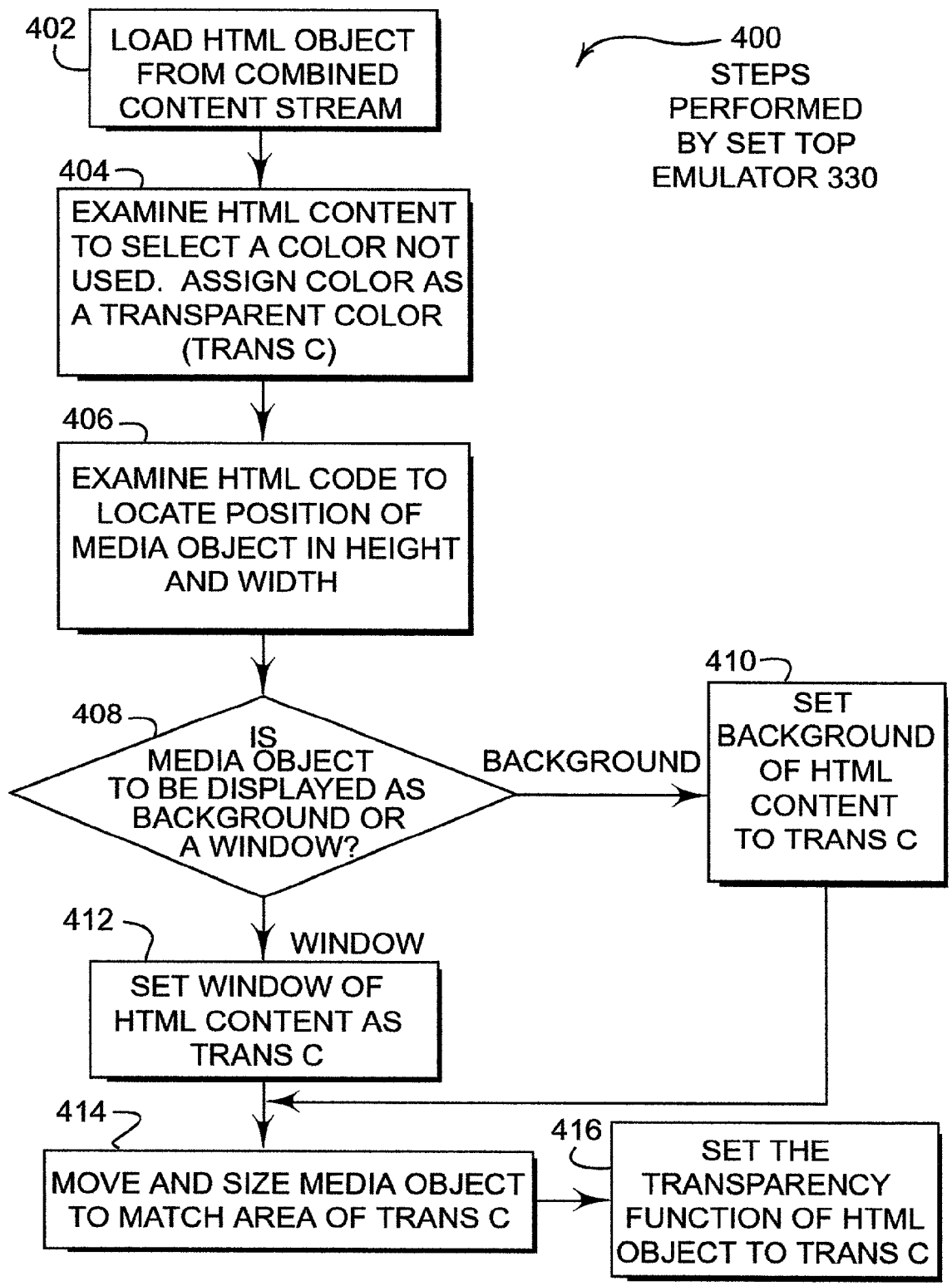
FIG. 4 is a flow diagram illustrating the operation of the software of the present invention.

FIG. 4 is a flow diagram illustrating the steps 400 performed by the set-top emulator 330. The set-top emulator 330 loads the HTML object 324 from the combined video and interactive content stream 328 at step 402. At step 404, the set-top emulator 330 examines the HTML content to select a color that is not used in the HTML content. That color is then designated as a transparent color (Trans C). At step 406, the set-top emulator 330 further examines the HTML code to locate the position of the media object that has been programmed into the HTML code as height and width data. At step 408, it is then determined whether the media object is to be displayed as background or in a window. If the HTML code indicates that the media object is to be displayed in the background, the background of the HTML content is set to Trans C at step 410. If the media object is to be displayed in a window, the window of the HTML content is set to Trans C. The process then proceeds to step 414 at which the set-top emulator 330 positions and sizes the media object to match the area designated as Trans C. In other words, the media object is positioned and sized to fit in a window if the HTML content has indicated the media object is to be displayed in a window. Alternatively, the media object is sized and located in the background portion of the HTML content if the HTML code indicates that the media object should be displayed in the background. At step 416, the transparency function of the HTML object is then set to Trans C so that the media object can be displayed in those areas that have been designated as Trans C.

Figure 5:
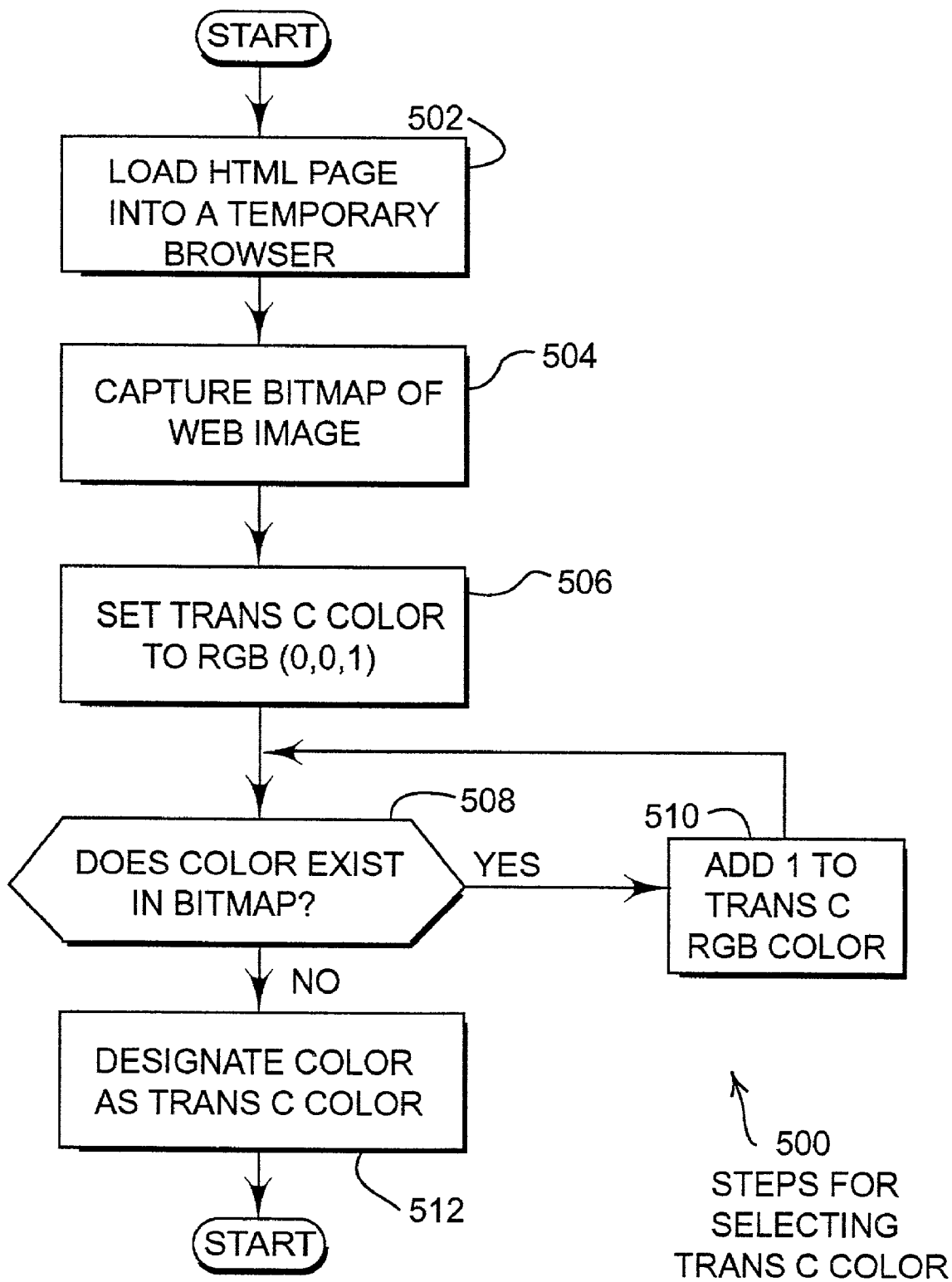
FIG. 5 is a flow diagram illustrating the steps for selecting a transparent color.

FIG. 5 is a flow diagram illustrating the steps 500 that are performed in the process of selecting the Trans C color as indicated in step 404 of FIG. 4. As shown in FIG. 5, a page of the HTML code is loaded into a temporary browser at step 502. At step 504, a bit map of the web image is captured. At step 506, the Trans C color is set to RGB (0,0,1) which is the first color away from black. At step 508, the system then determines whether that color exists in the bit map of the HTML web page. If that color does exist, one is added to the Trans C RGB color at step 510. For example, the RGB color on the second step becomes RGB (0,0,2). Each of the RGB colors may be an eight bit color so that the numbers range from 0 to 255. The process then returns to step 508 to determine if the new color that is set for Trans C is a color that exists in the web page bit map. If it is not, the Trans C color is set to that color, i.e. the color that has been found that does not exist in the web page bit map. That Trans C color is then made to be transparent.

Figure 6:
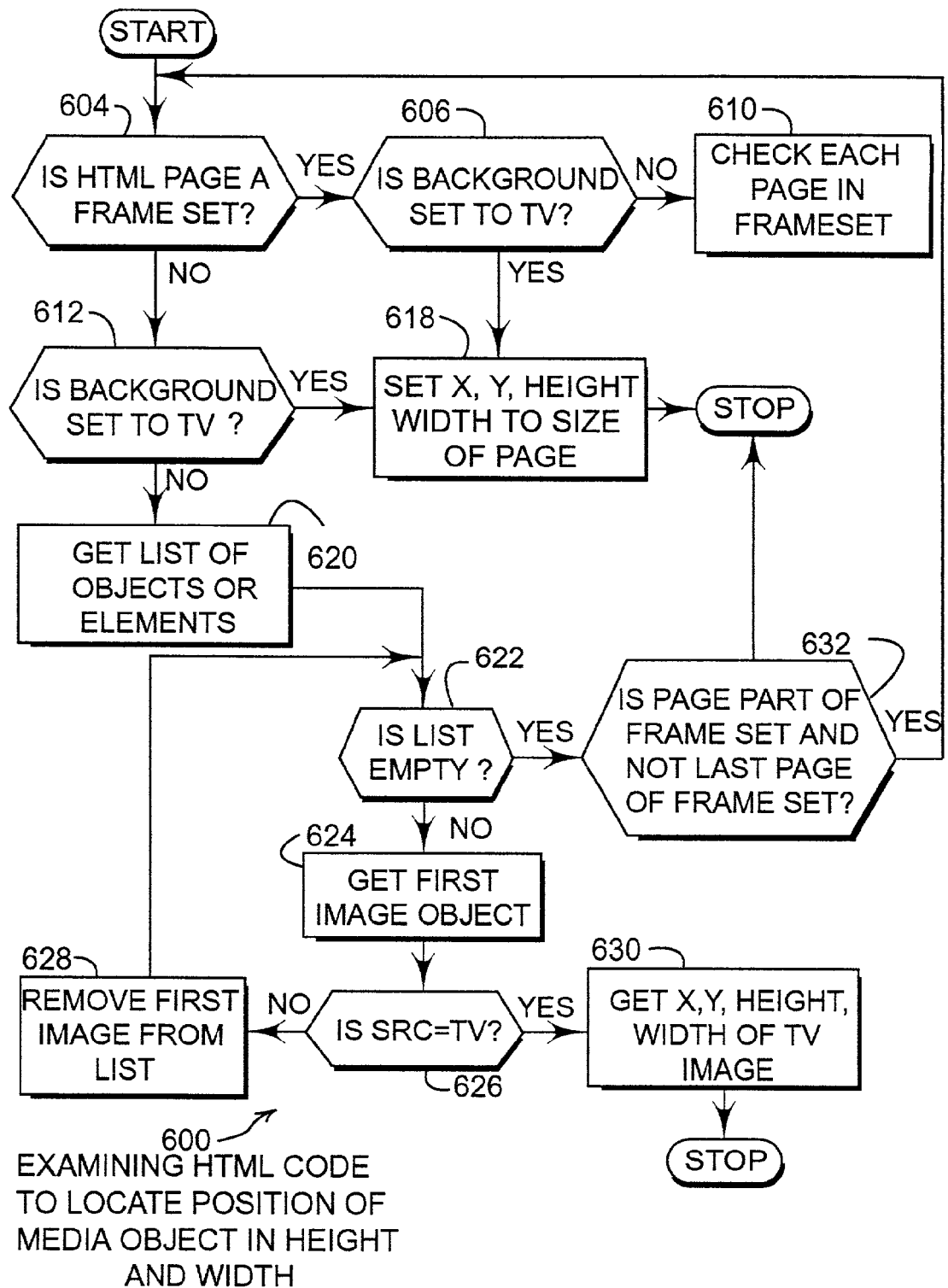
FIG. 6 is a flow diagram illustrating the steps for examining HTML code to locate the position of a media object.

FIG. 6 is a flow diagram illustrating the steps 600 that are performed for examining HTML code to locate the position of a media object in both height and width, as indicated as step 406 in FIG. 4. As shown in FIG. 6, at step 604, it is determined if an HTML web page includes any subpages that are referred to a frame set. For example, a single HTML web page may be constructed of a number of different HTML subpages. If the web page is constructed of several different subpages or constitutes a frame set, the process proceeds to step 606 where it is determined if the background of the frame set is set to TV (video). In other words, it is determined whether the HTML code indicates that the background information is TV (video) information, colors, graphics, or some other background information. If it is determined that the HTML code does not indicate that the background information is not a video signal, this process is repeated for each frame in the frame set at step 610. The process then returns to step 604. If it is determined at step 606 that the HTML code indicates that the video TV signal should appear in the background of the frame set, the process proceeds to step 618 where the coordinates X, Y, height and width are set to the size of the page. If it is determined at step 604 that the page does not constitute a frame set, the process proceeds to step 612 where it is determined if the HTML code indicates that the background is set to TV, i.e. if a video signal should appear in the background. If it is determined at step 612 that the HTML code indicates that the background is set to TV, the process proceeds to step 618 where the coordinates X, Y, height, width are set to the size of the page. The process then ends. If it is determined that the HTML code indicates that the background is not set to TV, the process proceeds to step 620. At step 620, a list of objects or elements is obtained from the HTML code. The process then proceeds to step 622 where it is determined if the list of objects or elements is empty. If the list of objects or elements is not empty, the process proceeds to step 624 where the first object or element in the list is obtained. The process then proceeds to step 626 where it is determined if the source (SRC) of an image object or element is a video signal or the object itself is a TV/Media object or element. If not, the first object or element is removed from the list at step 628 and the process returns to step 622. If the SRC of an image object or element is a video signal or the object or element itself is a TV/Media object, the process proceeds to step 630 where the coordinates X, Y, height and width of the object or element are obtained. The process then ends. If it is determined at step 622 that the list of objects or elements is empty, the process proceeds to step 632 where it is determined if the analysis is part of the frame set and not the last frame of the frame set. If it is, the process returns to step 604. If it is not, the process ends.

FIG. 7 is a program listing of an XML script 700 that illustrates how the enhanced content is defined for a specific page. As shown in FIG. 7, a page of enhanced content can be represented by a series of XML tags. At step 702, a page is declared via the <PAGE> tag with all subsequent tags, until the closing </PAGE> at step 732, being part of the page. Within the page, at step 704 is an element that is a graphic (step 706) whose name is declared at step 708. The graphic source is declared at step 710. The position of the graphic is provided at steps 712 and 714. Should the viewer click on this graphic, as it is shown on the television, the link to address (URL) is declared in step 716. Further a trigger is defined in step 718 of FIG. 7 that illustrates how, at a specific time defined in step 720, an action can occur. The action is defined to change the source (step 722) of the named graphic (step 724) to a new source (step 726). The end or scope of the trigger is declared in step 728, as well as the end of the element in step 730 and the end of the page in step 732. This XML script is then passed through an XSL parser to generate the emulation HTML and JavaScript, such as described in U.S. Provisional Application Ser. No. 60/227,063 entitled "A Data Driven System and Method for Distribution of Interactive Content to Multiple Targeted Presentation Platforms," filed Aug. 21, 2000,by Steven O. Markel which is specifically incorporated herein by reference for all that it discloses and teaches.

Figure 8:
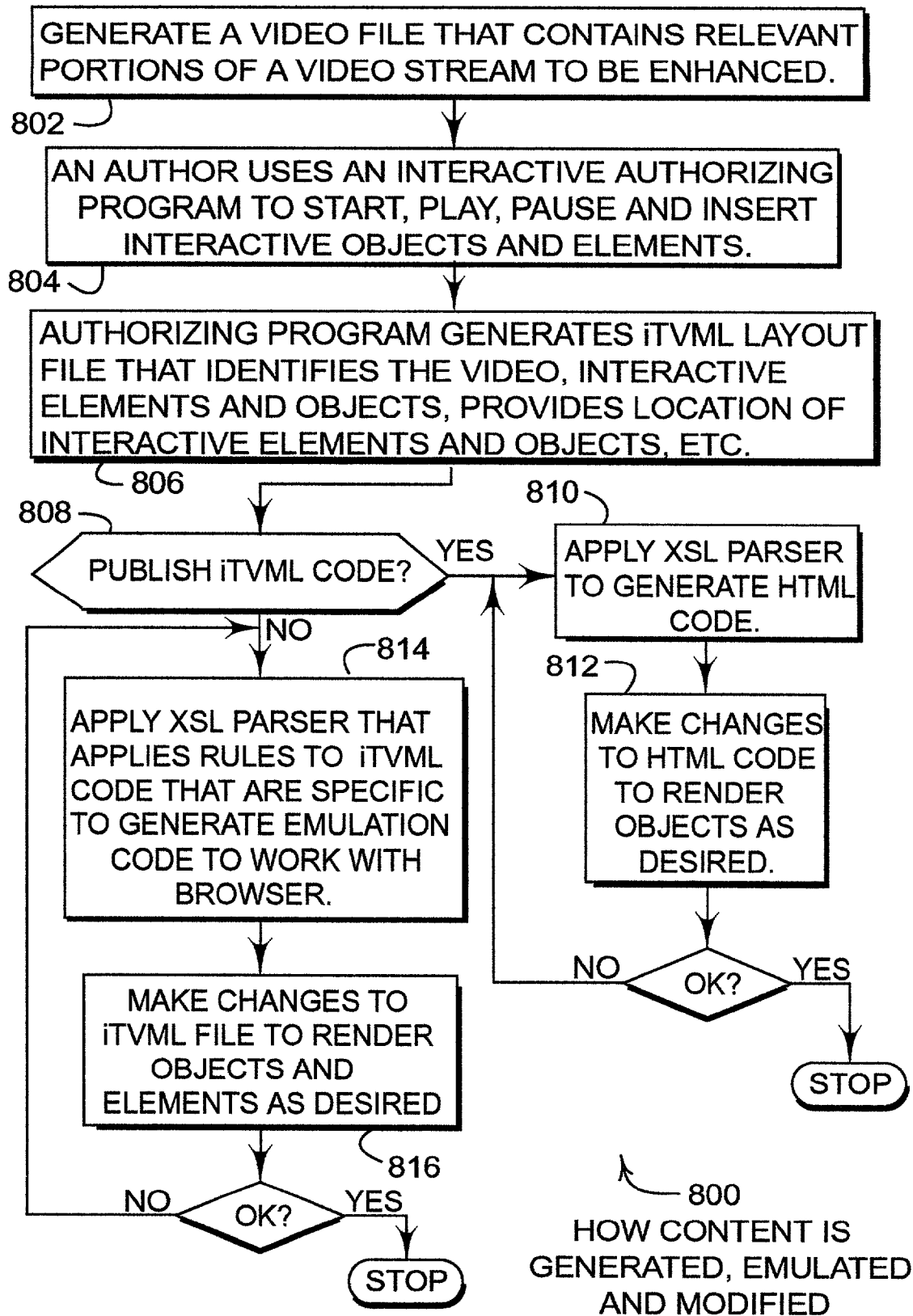
FIG. 8 is a flow diagram that illustrates how content is generated, emulated and modified.

FIG. 8 is a flow diagram that illustrates the steps 800 that show how content is generated, emulated and modified in accordance with the present invention. At step 802, a video file is generated that contains relevant portions of a video stream to be enhanced. In other words, rather than using an entire video stream in order to view the emulation, a file is generated that contains relevant portions of the video stream that contains a significantly smaller amount of data which is easier to operate and manipulate. For example, only every 30$^{th}$ frame of video data may be captured in the video file which reduces the size of the video file by a factor of 30. At step 804, an author, who is someone that is generating an enhanced video segment, uses an interactive authoring program, such as disclosed in U.S. Provisional Application Ser. No. 60/227,930 entitled "System and Method for Web Based Enhanced Interactive Television Page Layout," filed Aug. 25, 2000, by Steven O. Markel which is specifically incorporated herein by reference for all that it discloses and teaches, to insert interactive objects and elements onto an interactive screen. The interactive authoring program allows the author to start, play, pause and stop the video. At step 806, the authoring program generates an iTVML layout file (page) that identifies the video file, the interactive elements and objects, provides locations of the interactive objects and elements on the interactive page and other similar functions. The iTVML layout file is a particular schema of XML code that provide time based actions that are applied to both video and interactive content. At step 808, it is then determined whether the iTVML code should be published. In other words, it is determined whether the iTVML code should be translated into HTML code and Java script that can be viewed through a set-top box.

If it is determined at step 808 that the iTVML code should not be published, the process proceeds to step 814. At step 814, an XSL parser is applied to the iTVML code. The XSL parser applies rules to the iTVML code that are specific to generate emulation code that works with a browser used by the author's computer to generate a display of the enhanced video on the author's or other individual's computer screen as it would appear on a TV connected to a set-top box. The author or quality engineer or other individual viewing the emulated display can then access different portions of the code in a random fashion, rather than a serial fashion, to view the manner in which the enhanced program will be displayed. At step 816, the author or other individual can make actual changes in the iTVML code and then return to step 814 to apply the XSL parser and view the result of the changes. If it is determined at step 808 that the iTVML code should be published, the process proceeds to step 810 where the XSL parser is applied to the iTVML code to generate HTML code as disclosed in U.S. Provisional Application Ser. No. 60/227,063 entitled "A Data Driven System and Method for Distribution of Interactive Content to Multiple Targeted Presentation Platforms," filed Aug. 21, 2000, by Steven O. Markel. The HTML code can then be applied to a standard HTML processor in a set-top box and viewed on a TV. Alternatively, or in conjunction with the above, an XSL parser can be applied to the iTVML code that applies rules to the iTVML code that are specific to generate emulation code that can be viewed by a browser on the author's computer. At step 812, the author can then make changes to the code so that the interactive objects and elements appear as desired.

The present invention therefore provides a device that is capable of generating a graphics window on a computer monitor so that enhanced video can be viewed either as it is produced or randomly accessed from storage. The present invention enables an iTV producer or a quality control engineer to review the enhanced video to insure that it is properly laid out and important portions of either the iTV content or video stream are not obscured. The combined video and interactive content stream can be randomly accessed so that quality control engineers only need to access certain portions of the video stream to check quality, rather than viewing an entire video stream. Further, iTV producers can view the results of the enhanced video in real time.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of emulating the functions performed by a set-top box to display an enhanced video stream on a computer, said enhanced video stream comprising enhanced content comprising a combination of video content and interactive content, the method comprising:
   generating a layout file that provides time based actions that are applied to said video content and said interactive content;
   applying a set of rules to said layout file that produce instructions that emulate the functionality of a set-top box when applied to a browser;
   examining said interactive content to select a color that is not being used by said interactive content;
   assigning said color as a transparent color;
   locating said video content in said enhanced video stream to generate video content location data;
   setting portions of said enhanced content corresponding to said video content location data as said transparent color.

2. The method of claim 1 further comprising;
   accessing various portions of said layout file in a random fashion to check proper layout of said layout file and make modifications.

3. The method of claim 2 further comprising;
   Publishing said enhanced video stream after said layout file has been checked and modified.

4. A system for emulating the functions of a set-top box to display an enhanced video stream said enhanced stream comprising a combination of video content and interactive content, the system comprising:
   interactive television producer code that is capable of generating said enhanced video stream;
   a storage device coupled to receive said enhanced video stream from said interactive producer code and store a video file;
   emulation code that generates a layout file, applies a set of rules to said layout file that produce instructions that emulate the functionality of a set-top box when applied to a browser, examines interactive content in said layout file to select a color not being used, sets said selected color to be transparent in said interactive content, locates video content in said layout file and generates video content layout data and sets portions of said enhanced content that corresponds to said video content layout data to be transparent.

5. A storage medium containing emulation code that emulates the functions performed by a set-top box to display an enhanced video stream on a computer, said enhanced video stream comprising enhanced content comprising a combination of video content and interactive content, said emulation code performing the following functions:

generating a layout file that provides time based actions that are applied to said video content and said interactive content;

applying a set of rules to said layout file that produce instructions that emulate the functionality of a set-top box when applied to a browser;

examining said interactive content to select a color that is not being used by said interactive content;

assigning said color as a transparent color;

locating said video content in said enhanced video stream to generate video content location data;

setting portions of said enhanced content corresponding to said video content location data as said transparent color.

* * * * *